United States Patent
Bai

(10) Patent No.: US 9,521,575 B2
(45) Date of Patent: Dec. 13, 2016

(54) CONGESTION CONTROL DEVICE AND METHOD FOR INTER-VEHICLE COMMUNICATION

(71) Applicant: HYUNDAI MOBIS CO., LTD., Seoul (KR)

(72) Inventor: Song Nan Bai, Seoul (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 754 days.

(21) Appl. No.: 13/866,188

(22) Filed: Apr. 19, 2013

(65) Prior Publication Data

US 2013/0336120 A1    Dec. 19, 2013

(30) Foreign Application Priority Data

Jun. 18, 2012    (KR) .................. 10-2012-0065045

(51) Int. Cl.
*H04W 28/02*    (2009.01)
*G08G 1/16*    (2006.01)

(52) U.S. Cl.
CPC ......... *H04W 28/0231* (2013.01); *G08G 1/161* (2013.01)

(58) Field of Classification Search
CPC .............................. H04L 47/10; H04L 47/30
See application file for complete search history.

(56) References Cited

U.S. PATENT DOCUMENTS

| | | |
|---|---|---|
| 6,718,181 B1 | 4/2004 | Sumasu et al. |
| 7,817,598 B2 | 10/2010 | Usuda et al. |
| 7,848,278 B2 | 12/2010 | Chen et al. |

(Continued)

FOREIGN PATENT DOCUMENTS

| | | |
|---|---|---|
| CN | 1304623 A | 7/2001 |
| CN | 1842217 A | 10/2006 |

(Continued)

OTHER PUBLICATIONS

Chinese Office Action issued Apr. 25, 2016 in counterpart Chinese Application No. CN 201210472739.3 (9 pages, in Chinese).

(Continued)

*Primary Examiner* — Andrew Lai
*Assistant Examiner* — Zhiren Qin
(74) *Attorney, Agent, or Firm* — NSIP Law

(57) ABSTRACT

The present invention relates to a vehicle communication system and method used when transmitting and receiving driving information of a vehicle to and from surrounding vehicles. According to the present invention, a host vehicle may transmit and receive driving information to and from its surrounding vehicles to find out information about a position, a speed, a driving direction, etc., thereby decreasing traffic accident risk. However, transmission and reception of the driving information may not be smoothly performed depending on surrounding communication conditions. The present invention provides a communication congestion control device and method for smoothly performing data transmission and reception between vehicles depending on surrounding conditions, by setting a time frame variably depending on surrounding communication conditions and transmitting data on the basis of the changed time frame.

17 Claims, 7 Drawing Sheets

(56) References Cited

U.S. PATENT DOCUMENTS

| | | | |
|---|---|---|---|
| 8,175,044 B2 | 5/2012 | Seki et al. | |
| 2003/0229778 A1* | 12/2003 | Oesterreicher | H04L 1/0083 713/150 |
| 2004/0193762 A1* | 9/2004 | Leon | H04L 29/06027 710/52 |
| 2006/0221892 A1* | 10/2006 | Usuda | H04W 72/121 370/328 |
| 2007/0155398 A1* | 7/2007 | Park | H04W 24/00 455/453 |
| 2008/0037577 A1* | 2/2008 | Nagura | H04L 1/1657 370/445 |
| 2008/0051970 A1* | 2/2008 | Oh | G06F 3/14 701/93 |
| 2008/0095134 A1* | 4/2008 | Chen | H04B 7/2606 370/342 |
| 2008/0114531 A1* | 5/2008 | Kagawa | G08G 1/163 701/119 |
| 2008/0175190 A1* | 7/2008 | Lee | G06F 21/10 370/328 |
| 2008/0291889 A1* | 11/2008 | Matsumoto | H04W 74/085 370/348 |
| 2009/0310608 A1* | 12/2009 | Chen | H04L 45/48 370/389 |
| 2010/0240409 A1 | 9/2010 | Muraoka | |
| 2010/0246456 A1 | 9/2010 | Suo et al. | |
| 2010/0312432 A1* | 12/2010 | Hamada | G08G 1/163 701/31.4 |
| 2012/0163799 A1* | 6/2012 | Lee | H04Q 11/0067 398/9 |
| 2013/0315217 A1* | 11/2013 | Chen | H04W 72/085 370/336 |

FOREIGN PATENT DOCUMENTS

| | | |
|---|---|---|
| CN | 101242627 A | 8/2008 |
| CN | 101356842 A | 1/2009 |
| CN | 101407199 A | 4/2009 |
| CN | 101542553 A | 9/2009 |
| CN | 101573994 A | 11/2009 |
| CN | 201570126 U | 9/2010 |
| CN | 101908283 A | 12/2010 |
| CN | 101926198 A | 12/2010 |
| JP | 2004-154851 | 5/2004 |
| JP | 2006-65667 A | 3/2006 |
| JP | 2010-011414 A | 1/2010 |
| KR | 10-2006-0101936 | 9/2006 |
| KR | 10-2006-0101991 | 9/2006 |

OTHER PUBLICATIONS

Chinese Office Action issued on Sep. 27, 2016, in counterpart Chinese Application No. 201210472739.3 (5 pages in Chinese).

* cited by examiner (a)

(b)

(c)

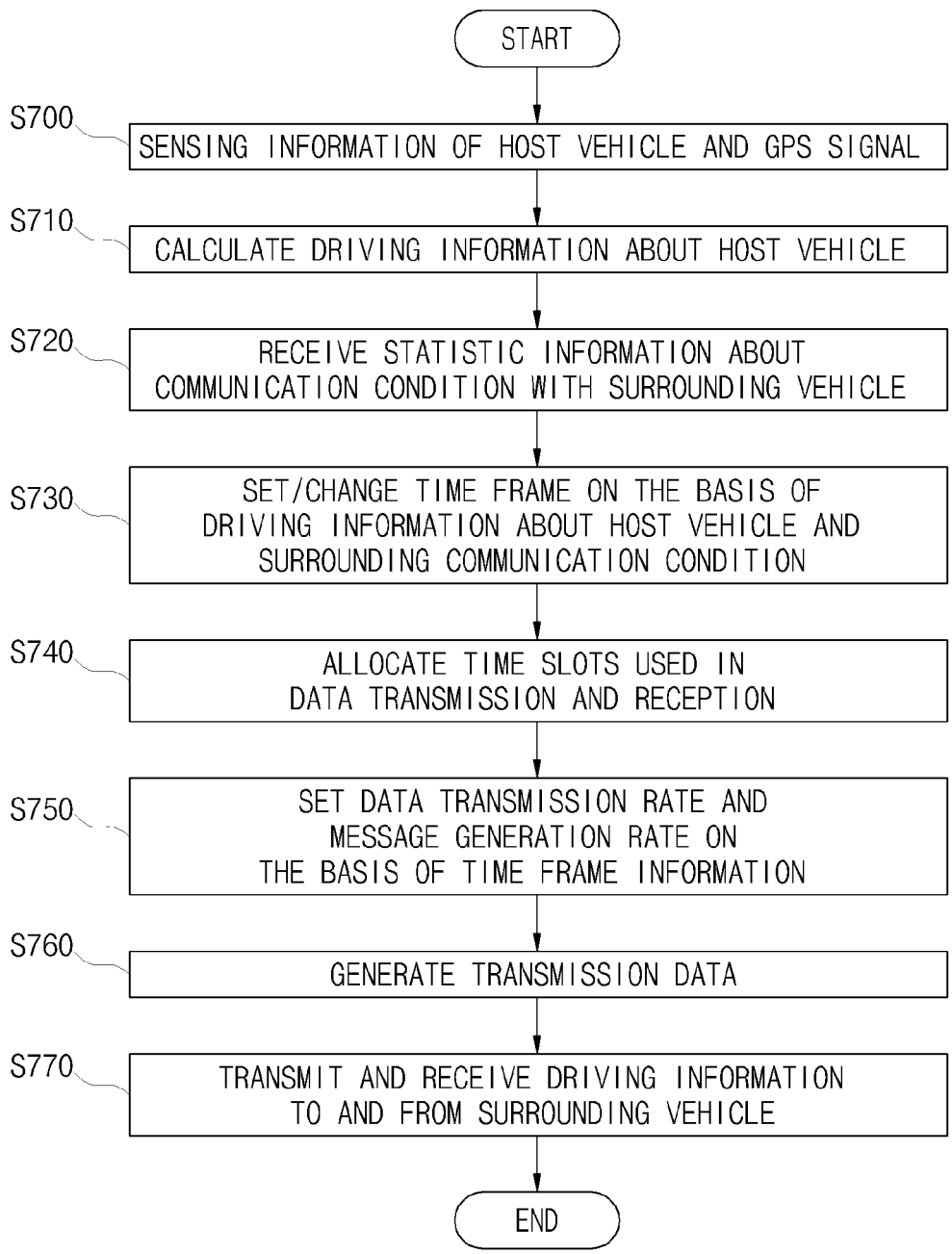

CONGESTION CONTROL DEVICE AND METHOD FOR INTER-VEHICLE COMMUNICATION

CROSS-REFERENCE TO RELATED APPLICATIONS

This application claims priority under 35 U.S.C. §119 to Korean Patent Application No. 10-2012-0065045, filed on Jun. 18, 2012, the disclosure of which is incorporated herein by reference in its entirety.

TECHNICAL FIELD

The present disclosure relates to a device and method for controlling communication congestion in an inter-vehicle communication system where a host vehicle transmits its driving information to surrounding vehicles and receives their driving information therefrom, and in particular, to a congestion control device and method for changing settings (for example, time frame period, number of slots, transmission power, data transmission rate, etc.) of a time frame in a distributed processing method on the basis of driving conditions and communication channel states of the surrounding vehicles, allocating time slots, and transmitting/receiving data, thereby solving congestion problems in a network and increasing utilization of wireless resources.

BACKGROUND

Research is being conducted to apply inter-vehicle communication technologies to a vehicle safety system, which aims to increase transportation efficiency and driving convenience. Inter-vehicle communication is performed at a previously allocated frequency band (for example, 5.9 GHz) when a plurality of vehicles are in a communication enabled area, which uses a short range communication technology (for example, Wireless Access in Vehicular Environment (WAVE) communication) based on Carrier sense multiple access with collision avoidance (CSMA/CA).

An inter-vehicle communication based vehicle safety system periodically broadcasts the position, speed, moving direction, and control information of the host vehicle to the surrounding vehicles in order to monitor traffic conditions around the vehicle in real time. Each vehicle predicts a collision situation on the basis of the driving information about the surrounding vehicles received through the inter-vehicle communication, to give a warning to the driver or surrounding vehicles if necessary.

FIG. 1 is a block diagram showing a related art inter-vehicle communication system.

A related art vehicle to vehicle (V2V) communication system includes an integrated information processing module 100, a sensor information reception module 110, a GPS signal reception module 120, and an inter-vehicle communication module 130.

The integrated information processing module 100 receives a sensing signal of a vehicle and a GPS signal from the sensor information reception module 110 and the GPS signal reception module 120, respectively, and then integrates, manages, and processes driving information (position, speed, driving direction, in-vehicle network information, driver manipulation information, etc.). The inter-vehicle communication system periodically (for example, for each 100 ms) broadcasts driving information about the host vehicle to the surrounding vehicles through the inter-vehicle communication module 130 (for example, WAVE).

The driving information about the surrounding vehicles received through the inter-vehicle communication module 130 is delivered to the integrated information processing module 100. The integrated information processing module 100 delivers the driving information about the host vehicle and its surrounding vehicles to an inter-vehicle safety service system 140 to perform functions such as risk degree determination, warning, etc.

FIG. 2 illustrates a channel load depending on surrounding conditions of a vehicle when the inter-vehicle communication is performed through a related art inter-vehicle communication system.

As illustrated in FIG. 2a, when a small number of vehicles travel around the host vehicle and thus the number of nodes communicating with the host vehicle is small, the channel load is so low that a data reception ratio increases and a channel access delay time decreases, thereby improving reliability of the system. However, as illustrated in FIG. 2b, when there are a lot of surrounding vehicles, i.e., a lot of nodes communicating with the host vehicle, the channel load is so high that the data reception ratio decreases and the channel access delay time increases, thereby deteriorating the reliability of the system.

The CSMA/CA based wireless communication technology, which is used to periodically broadcast driving information to surrounding vehicles, has a problem in that a data transmission success rate is reduced due to frequent variation in network topologies caused by high mobility of vehicles, data collision caused by hidden node problem, etc.

Furthermore, the CSMA/CA based wireless communication technology has a network congestion problem where transmission delay and data loss increase dramatically due to excessive competition between nodes when there are an enormous number of inter-vehicle communication nodes (for example, downtown intersection, highway bottleneck) and does not have a function of managing transmission power, data transmission rate, and data transmission period depending on wireless channel states in order to solve the network congestion problem in the inter-vehicle communication.

SUMMARY

Accordingly, the present disclosure provides a congestion control device and method for changing settings of the time frame in consideration of surrounding communication conditions during data transmission and reception between vehicles and then generating transmission data on the basis of the time frame information that is changeably set, thereby solving the network congestion problem occurring in communication between an enormous number of vehicles and ensuring reliability of the communication to enhance use efficiency of wireless resources.

In one general aspect, a communication congestion control device includes: an external sensor integration module receiving at least one of a sensing signal of a vehicle and a GPS signal and delivering driving information of the vehicle generated on the basis of the signal to a network congestion control unit; a wireless resource management module receiving statistic information about a communication condition with surrounding vehicles and driving information about the surrounding vehicle from a communication module of the vehicle and delivering the statistic information and the driving information to the network congestion control unit; a network congestion control unit determining a setting change time point of a time frame on the basis of the statistic information about the communication condition and generating transmission data on the basis of the time frame information received from a time frame design unit; a time frame design unit changing the setting of the time frame variably depending on a surrounding communication condition and delivering the changed setting of the time frame to the network congestion control unit.

The time frame design unit may set a period of the time frame on the basis of an average driving speed of the vehicle, set the number of time slots of the time frame on the basis of the number of surrounding vehicles located in an area capable of communicating with the vehicle over a preset reception ratio, and change the setting of the time frame at a certain time interval during driving of the vehicle.

The network congestion control unit may set at least one of a data transmission rate, a message generation rate, and transmission power used in the data transmission on the basis of the time frame information, and set the data transmission rate on the basis of a length of time slots of the time frame and the massage generation rate on the basis of a period of the time frame.

In another general aspect, a communication congestion control method includes: receiving driving information about surrounding vehicles and statistic information about communication conditions with the surrounding vehicles; setting and changing a time frame to be used in data transmission and reception on the basis of the driving information and the statistic information; setting a data transmission rate and a message transmission rate used when generating data to be transmitted to the surrounding vehicles; and generating data on the driving information about the vehicle on the basis of the data transmission rate and the message generation rate and transmitting the data to the surrounding vehicles.

Other features and aspects will be apparent from the following detailed description, the drawings, and the claims.

BRIEF DESCRIPTION OF THE DRAWINGS

FIG. 7 is a flowchart illustrating a communication congestion control method according to an embodiment of the present invention.

DETAILED DESCRIPTION OF EMBODIMENTS

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

In the following description, the technical terms are used only for explaining a specific exemplary embodiment while not limiting the inventive concept. The terms of a singular form may include plural forms unless specifically mentioned. The meaning of "comprises" and/or "comprising" specifies an element, a step, a process, and/or a component but does not exclude other elements, steps, processes, and/or components. Embodiments of the present invention will be described below in more detail with reference to the accompanying drawings.

Figure 1:
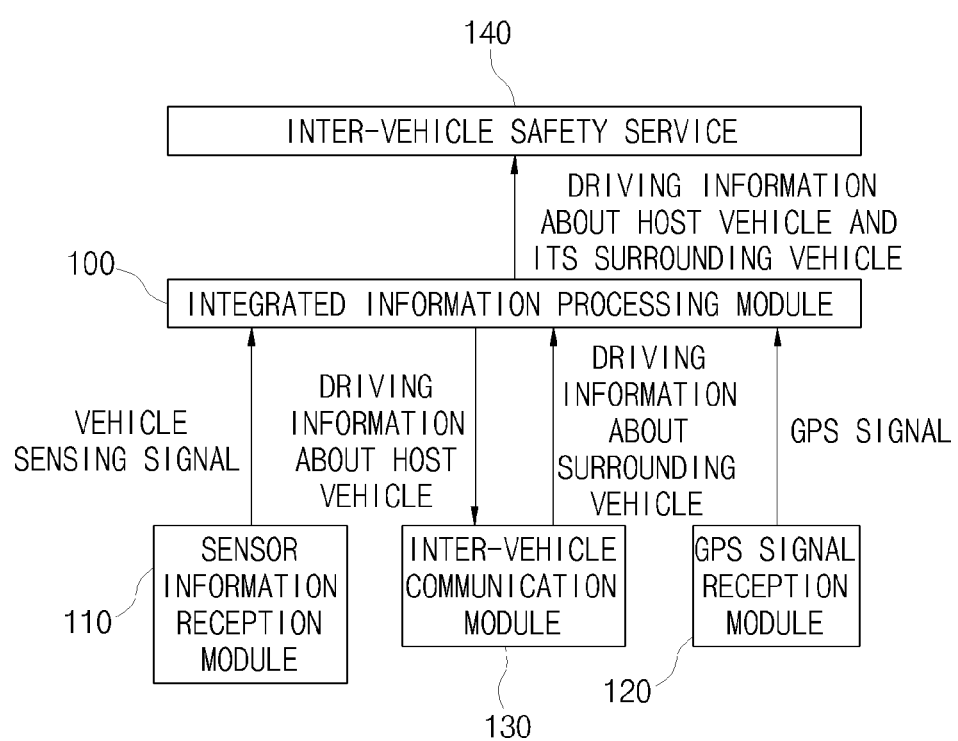
FIG. 1 is a block diagram showing a structure of a related art vehicle communication system.
Figure 2:
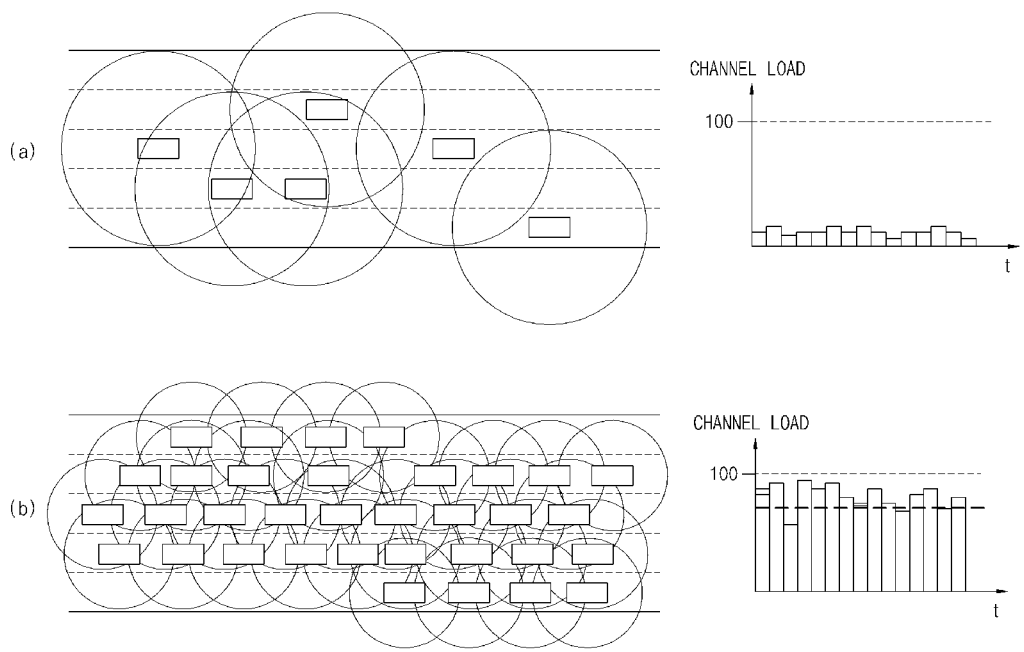
FIG. 2 illustrates a channel load depending on driving conditions of a vehicle under the related art vehicle communication system.
Figure 3:
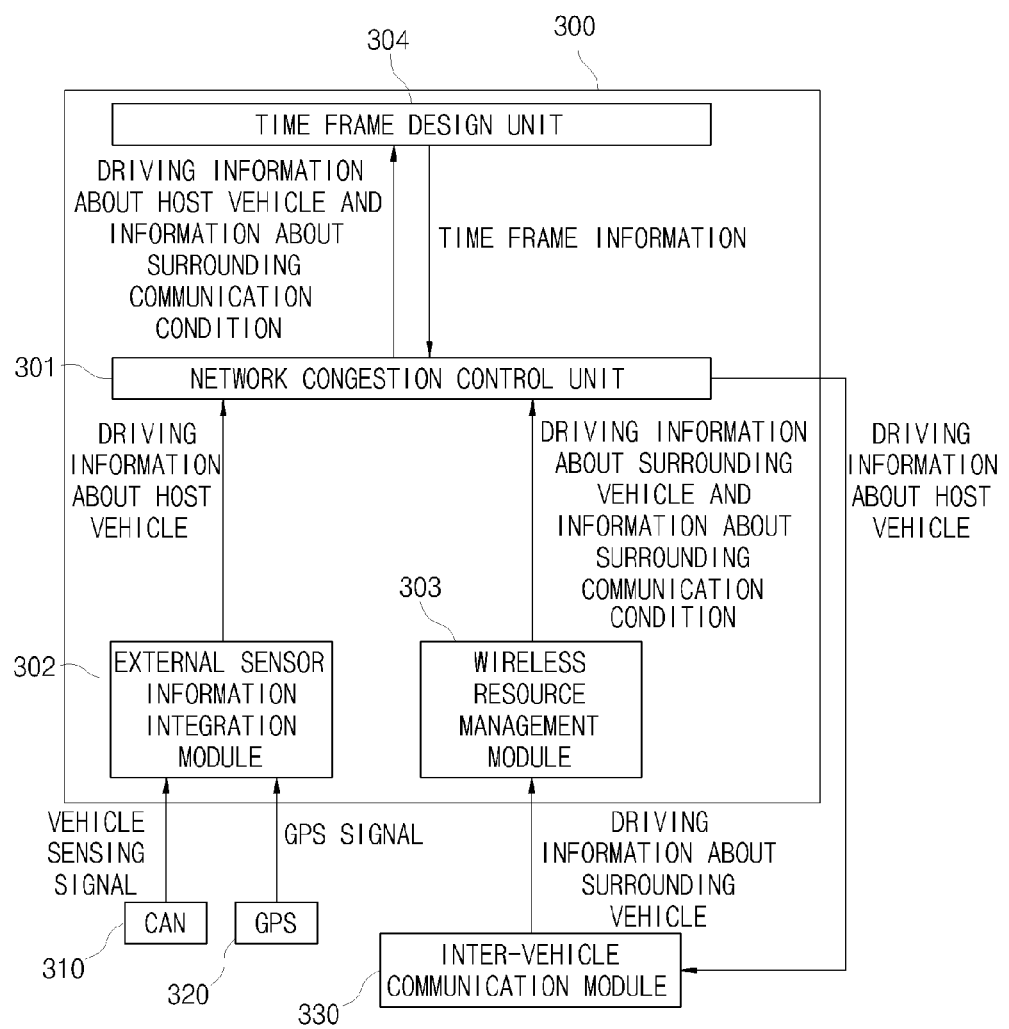
FIG. 3 shows a structure of a communication congestion control device according to an embodiment of the present invention.

FIG. 3 illustrates a structure of a communication congestion control device according to an embodiment of the present invention.

The communication congestion control device 300 includes a network congestion control unit 301, an external sensor information integration module 302, a wireless resource management module 303, and a time frame design unit 304.

The external sensor information integration module 302 receives information regarding speed, acceleration, driving direction, brake state, steering angle, etc. of a vehicle, which are sensed by sensors of the vehicle, through an in-vehicle network (for example, controller area network (CAN) communication), and periodically receives a GPS signals received by a GPS receiver of the vehicle. The external sensor information integration module 302 outputs driving information about the vehicle, such as position, speed, moving direction, etc. on the basis of the received vehicle information and GPS information to deliver the driving information to the network congestion control unit 301.

The wireless resource management module 303 receives driving information about surrounding vehicles, which is received by the inter-vehicle communication module 330 from the surrounding vehicles. Also, the wireless resource management module 303 receives statistic information about surrounding communication conditions, which is measured by the inter-vehicle communication module 330. The wireless resource management module 303 delivers the driving information about the surrounding vehicles and the information about surrounding communication conditions to the network congestion control unit 301.

The information about the surrounding communication conditions received by the wireless resource management module 303 includes a channel load, a packet error rate (PER), etc. The channel load indicates a time when a channel is occupied by one second wireless transmission, which is represented by percentage. PER is a value that is obtained by dividing the number of packets successfully received from surrounding vehicles for 1 second by the number of packets that should be received from the current surrounding vehicles. In this case, the number of packets that should be received from the surrounding vehicles is a value obtained by multiply the number of surrounding vehicles by the value of (1/(time frame period; for example, 100 ms)).

The communication congestion control device 300 sets the time frame such that the data reception ratio from the surrounding vehicles is over a certain level (for example, 95%).

The time frame design unit 304 sets the time frame variably depending on the vehicle driving information and surrounding communication conditions. The time frame design unit 304 receives the driving information about the host vehicle from the external sensor information integration module 302. A period of the time frame may be set on the basis of the vehicle driving speed in the driving information about the host vehicle (for example, the time frame period may be set to 200 ms when the current average driving speed is 60 km/h).

The time frame design unit 304 sets or changes the number of time slots of the time frame. The number of time slots may change on the basis of surrounding conditions and may be set on the basis of the number of surrounding vehicles located in an area where the surrounding vehicles can communicate with the host vehicle over a preset reception ratio. For example, when the host vehicle has its 9 surrounding vehicles located in an area capable of communicating with the vehicle at the reception ratio of 90% or more (i.e., the total number of expected nodes is 10), the number of time slots may be set to 20, which is two times greater than the total number of expected nodes.

The time frame design unit 304 may continually change the settings of the time frame at a certain time period. For example, the time frame design unit 304 may perform the change in units of a second on the basis of the UTC time.

The time frame design unit 304 delivers information about the set or changed time frame to the network congestion control unit 301.

The network congestion control unit 310 outputs an instruction for transmitting driving information about the host vehicle and receives driving information about the surrounding vehicle from the wireless resource management module 303. Also, the network congestion control unit 301 receives statistic information about surrounding communication conditions from the wireless resource management module 303 and, when the statistic information about communication channel state is satisfied with a preset channel state, delivers an instruction for changing the settings of the time frame to the time frame design unit 304.

The network congestion control unit 301 receives information about the time frame from the time frame design unit 304. Then, the network congestion control unit 301 performs settings for transmission data and generates the transmission data on the basis of the time frame that is changeably set.

The network congestion control unit 301 sets data transmission rate, message generation rate, transmission power, etc. on the basis of the period of the time frame and the number of time slots.

The data transmission rate is set on the basis of the length of the time slot. The length of the time slot may be calculated from the period of the time frame and the number of time slots. For example, if the period of the time frame is 200 ms and the number of time slots is 20, the length of one time slot is 10 ms. Since a packet having a size of 400 to 600 byte should be able to be transmitted for 10 ms and a communication speed available to the inter-vehicle communication is 3, 4, 5, 6, 9, 12, or 18 Mbps, the data transmission rate may be set to be 3 Mbps.

When the number of surrounding vehicles increases at the current transmission power, the number of time slots increases and thus the number of time slot relatively decreases. Accordingly, the data transmission rate should be set to be a large value. In this case, when the data transmission rate needs to be set over the maximum communication speed that is available to the inter-vehicle communication, data transmission and reception may be smoothly performed between the host vehicle and its surrounding vehicles at the range of allowed inter-vehicle communication speed, by decreasing the level of the transmission power to decrease the number of surrounding vehicles in an area capable of communicating with the vehicle.

The message generation rate is equal to the time frame period. Thus, when the time frame period is 200 ms, the message generation rate is set to be 5 Hz.

The network congestion control unit 310 checks the existence or not of time frame information and allocated time slots when a data transmission event occurs. When there is not an allocated time slot, the network congestion control unit 310 requests the allocation of time slots, generates transmission data, and then transmits the generated transmission data to vehicles around the host vehicles through the inter-vehicle communication module 330 to deliver the driving information about the host vehicle.

Figure 4:
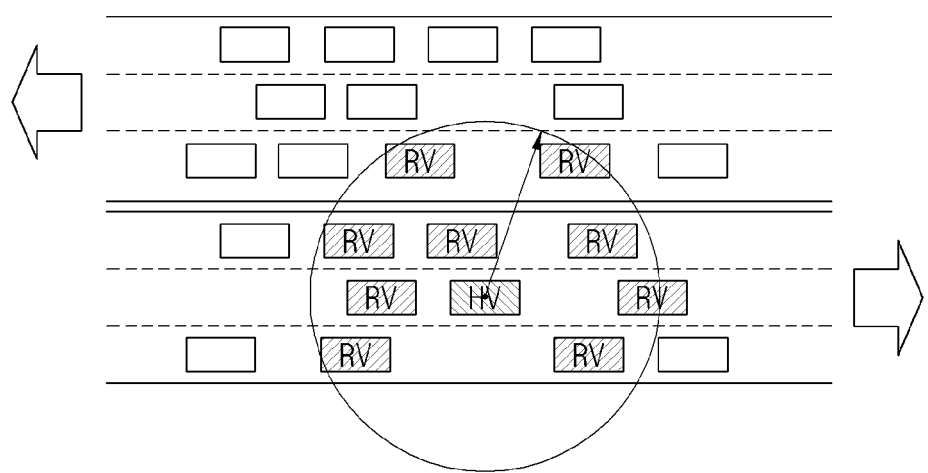
FIG. 4 illustrates an example of the communication congestion control device according to an embodiment of the present invention.

FIG. 4 illustrates an exemplary environment where the communication congestion control device is executed according to an embodiment of the present invention.

HV indicates a host vehicle, and RV indicates a remote vehicle, i.e., surrounding vehicle. The host vehicle may transmit and receive driving information to and from the surrounding vehicles to find the driving conditions of the surrounding vehicles, thereby decreasing the risk of accidents that may occur while driving.

An area where the data reception ratio of the host vehicle is greater than a preset reception ratio is illustrated as a circle in FIG. 4. The host vehicle transmits and receives driving information to and from 9 surrounding vehicles located inside the circle. In this case, the period of the time frame and the number of time slots are set or changed considering the change of conditions such as the number of vehicles including the host vehicles, driving speed of the host vehicle, etc.

The size of the circle indicating the area where the host vehicle transmits and receives driving information to and from the surrounding vehicles may vary depending on the level of transmission power. In this case, communication speed may be low if the communication area is excessively large, and driving information about surrounding vehicles may be not sufficiently found if the communication area is excessively small. Accordingly, the communication area needs to be controlled considering surrounding conditions. If the number of surrounding vehicles located in the communication area of the host vehicle is large and the inter-vehicle communication speed is not sufficiently high, communication with surrounding vehicles may be smoothly performed by decreasing the level of transmission power.

Figure 5:
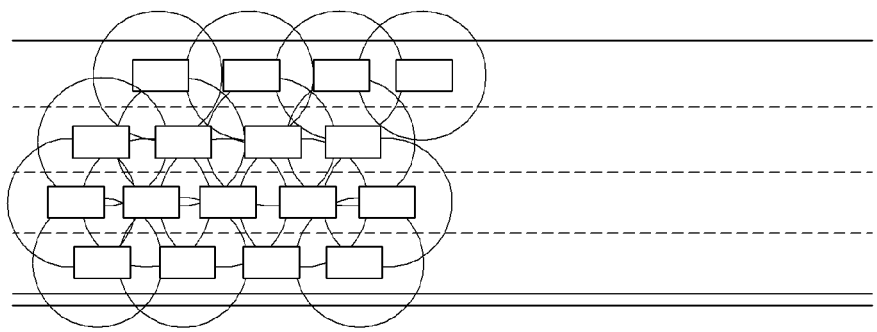
FIG. 5 illustrates an example where the time frame is set on the basis of driving conditions of a vehicle by the communication congestion control device according to an embodiment of the present invention.
Figure 5:
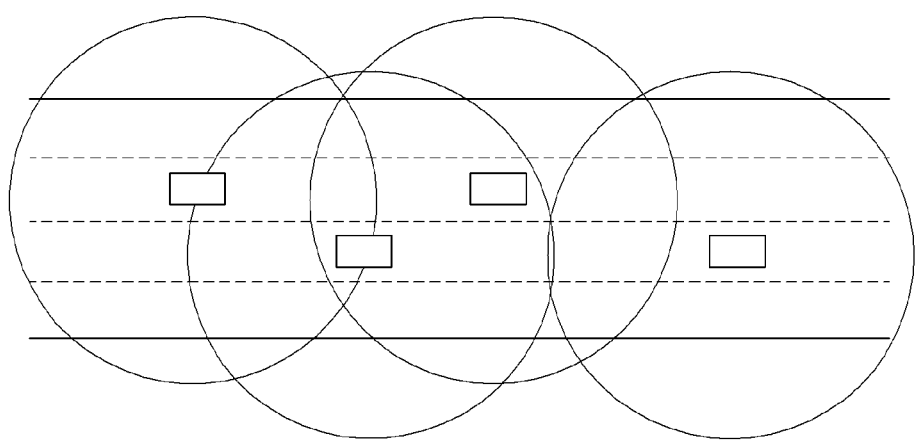
Figure 5:
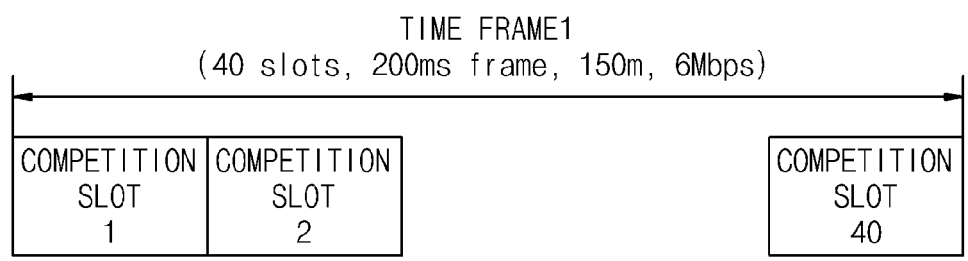
Figure 5:
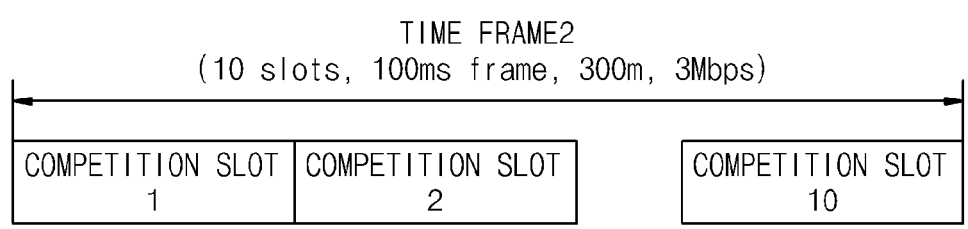

FIG. 5 illustrates an example where setting of a time frame is changed on the basis of surrounding conditions around a vehicle by the communication congestion control device according to an embodiment of the present invention. FIG. 5c illustrates the change in setting of the time frame in driving conditions as shown in FIGS. 5a and 5b.

FIG. 5a illustrates a case in which the number of vehicles driving around a host vehicle is large and thus the speed of the vehicles is low and the number of communicating vehicles is large. In this case, the period of the time frame is set to be long because the speed of the vehicles is low, and the number of time slots is set to be large because the number of communicating nodes is large.

Time frame 1 of FIG. 5c represents an example of the time frame in the condition as shown in FIG. 5a. In time frame 1, the period of the time frame is set to be 200 ms, and the number of time slots is set to be 40. Accordingly, the data transmission rate is set to be 6 Mbps, considering that one time slot has a length of 5 ms. Furthermore, when the number of surrounding vehicles is large, the communication area may be controlled to have a diameter of 150 m by controlling the level of the transmission power, in order to prevent to reduce the data reception ratio due to an excessive number of communicating nodes.

FIG. 5b illustrates a case in which the number of vehicles driving around a host vehicle is small and thus the speed of the vehicles is fast and the number of communicating vehicles is small. In this case, the period of the time frame is set to be short because the speed of the vehicles is high, and the number of time slots is set to be small because the number of communicating nodes is small.

Time frame 2 of FIG. 5c represents a time frame obtained by changing time frame 1 when the driving condition of FIG. 5a is changed to the driving condition of FIG. 5b.

In time frame 2 of FIG. 5c, the period of the time frame is set to be 100 ms, and the number of time slots is set to be 10 because the vehicle speed increases and the number of surrounding nodes decreases. Accordingly, the data transmission rate is set to be 3 Mbps, considering that one time slot has a length of 10 ms. Furthermore, when the number of surrounding vehicles is small, the communication area may be controlled to have a diameter of 300 m by increasing the level of the data transmission power.

As illustrated above, the present invention changes the setting of the time frame in real time on the basis of the change in the driving speed of the vehicle and the change in the number of surrounding vehicles communicating with the host vehicle and utilizes the changed setting of the time frame in data transmission and reception, thereby allowing wireless resources to be efficiently used in communication between vehicles.

Figure 6:
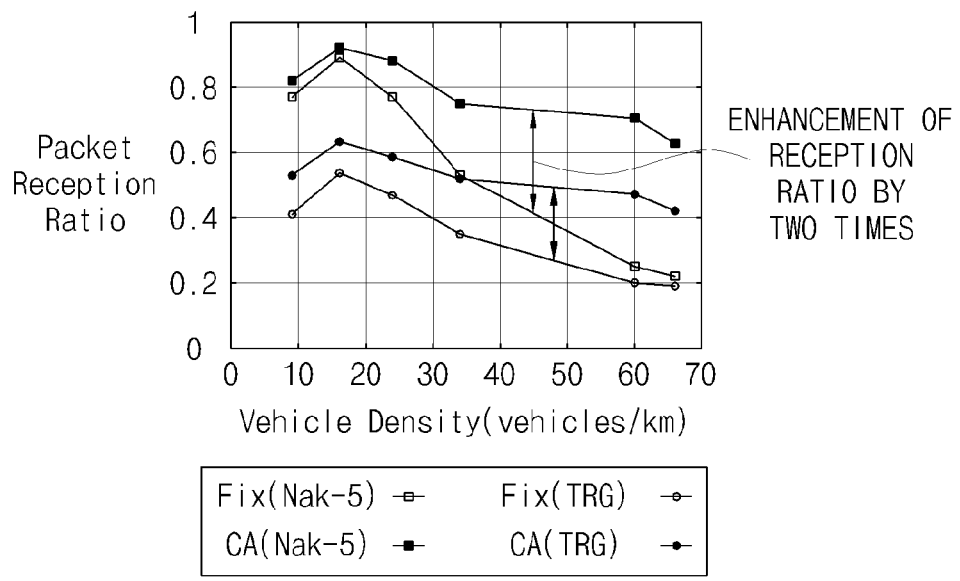
FIG. 6 illustrates an inter-vehicle communication simulation result obtained using the communication congestion control device according to an embodiment of the present invention.
Figure 6:
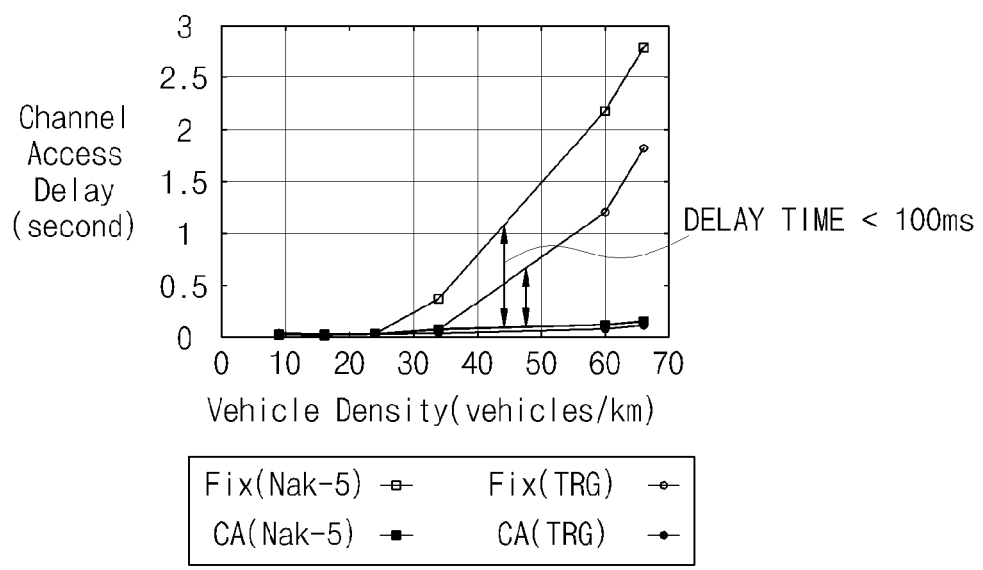

FIG. 6 illustrates a simulation result of the communication congestion control device according to an embodiment of the present invention.

On the graph, CA indicates a technique for applying a variable transmission period, power, and transmission rate depending on situations, and Fix indicates a technique for applying a fixed transmission period, power, and transmission rate.

The left graph of FIG. 6 represents packet reception ratios depending on vehicle densities, and represents a packet reception ratio when a data transmission period, power, and transmission rate are variably applied and a packet reception ratio when a data transmission period, power, and transmission rate are fixedly applied. As illustrated in the graph, the reception ratio using the variable transmission period is two times higher than the reception ratio using the fixed transmission period.

The right graph of FIG. 6 represents channel access delays depending on vehicle densities, and may shows that the channel access delays are short when using a variable transmission period, power, and transmission rate depending on driving conditions.

FIG. 7 is a flowchart illustrating a communication congestion control method according to an embodiment of the present invention.

The communication congestion control system receives information regarding speed, acceleration, steering angle, driving direction, etc. of a vehicle from sensors of the vehicle and receives a GPS signal is received from a GPS receiver (S700), and calculates driving information regarding position, speed, moving direction, etc. of a host vehicle on the basis of the received information (S710).

The communication congestion control system receives statistic information regarding communication state between the surrounding vehicles while receiving driving information about surrounding vehicles, which is transmitted by the surrounding vehicles located around the host vehicle (S720). The statistic information regarding surrounding communication conditions caused during a process of transmitting and receiving data on the driving information may include a channel load, a noise histogram, or a packet error rate in a frequency band that is periodically used. The surrounding communication conditions are determined using the information.

The communication congestion control system changes the setting of the period of the time frame and the number of time slots, on the basis of the surrounding communication conditions and the driving information about the host vehicle (S730). The congestion communication condition may be controlled by changing the setting of the time frame, thereby increasing the utilization of wireless resources. The setting of the time frame may be changed when the statistic information regarding the communication channel state is satisfied with the preset channel state (for example, the channel load or PER is over a certain ratio) or may be repeatedly changed at a certain time period.

The communication congestion control system checks the existence of information about the time frame to be used in data transmission and requests the allocation of time slots when the host vehicle transmits the driving information about the host vehicle (S740).

The communication congestion control system sets the data transmission rate, message generation rate, and transmission power, etc. on the basis of the information about the time frame (S750). The communication congestion control system generates data on the driving information of the host vehicle on the basis of the set data transmission environment (S760), and transmits and receives the driving information to and from the surrounding vehicles (S770). The communication congestion control system changes the setting of the time frame in consideration of the driving condition of the host vehicle and the surrounding communication conditions by periods, and continually transmits and receives data on the surrounding vehicles and driving information.

The present invention uses statistics of information regarding a frequency band that is periodically used and information regarding data that is successfully transmitted or received to perform wireless communication using a time frame that is changeably set, thereby maximizing bandwidth-use efficiency in an inter-vehicle communication network, enhancing reliability of communication between vehicles, and ensuring prevention of communication delays required by an application service.

The above-disclosed subject matter is to be considered illustrative, and not restrictive, and the appended claims are intended to cover all such modifications, enhancements, and other embodiments, which fall within the true spirit and scope of the present invention. Accordingly, embodiments of the present invention are intended not to limit, but to explain the technical spirit of the present invention. The scope of the present invention is not limited by these embodiments. The scope of the invention should be construed in accordance with the following claims, and all technical ideas should be construed as covering all the modifications, equivalents, and replacements within the scope of the present invention.

What is claimed is:

1. A communication congestion control device, comprising:
an external sensor integration processor configured to receive a signal comprising at least one of a sensing signal of a vehicle and a GPS signal and generating driving information of the vehicle based on the signal;

a wireless resource management processor configured to received statistic information of a communication condition with a surrounding vehicle and driving information of the surrounding vehicle from a communication processor of the vehicle;

a time frame design processor configured to set a time frame based on the communication condition and to set a period of the time frame based on a average driving speed of the vehicle; and a network congestion control processor configured to receive the driving information of the vehicle and the driving information of the surrounding vehicle, to determine a setting change time within the time frame based on the statistic information, to generate transmission data based on the time frame, and to set data transmission rate based on a length of a time slot in the time frame, wherein the statistic information comprises an error rate, and wherein the network congestion control processor decreases a level of transmission power when a data transmission rate is over a maximum data transmission rate available during inter-vehicle communication.

2. The communication congestion control device of claim 1, wherein the time frame design processor sets a period of the time frame based on an average driving speed of the vehicle.

3. The communication congestion control device of claim 1, wherein the time frame design processor is further configured to set a number of time slots in the time frame based on a number of surrounding vehicles located in an area capable of communicating with the vehicle over a preset reception ratio.

4. The communication congestion control device of claim 1, wherein the setting change time is further based on a preset time interval during driving of the vehicle.

5. The communication congestion control device of claim 4 wherein the preset time interval is in units of a second.

6. The communication congestion control device of claim 1, wherein the network congestion control processor sets at least one of a data transmission rate, a message generation rate, and a transmission power used during the data transmission based on the time frame.

7. The communication congestion control device of claim 1, wherein the network congestion control processor sets a message generation rate based on a period of the time frame.

8. The communication congestion control device of claim 1, wherein the driving information of the surrounding vehicle comprises at least one of a speed, position, driving direction, MAC address, and vehicle ID.

9. The communication congestion control device of claim 1, wherein the statistic information further comprises at least one of a channel load in a frequency band that is periodically used, a noise histogram, and a data transmission and reception ratio with the surrounding vehicle.

10. The communication congestion control device of claim 1, wherein the network congestion control processor requests an allocation of a time slot in the time frame.

11. The communication congestion control device of claim 1, wherein the period of the time frame is set to be long upon a determination that the average driving speed is high and set to be short upon a determination that the average driving speed is low.

12. The communication congestion control device of claim 1, wherein the statistic information further comprises information regarding data that is successfully transmitted or received.

13. The communication congestion control device of claim 1, wherein the network congestion control processor sets a data transmission rate based on an amount of data to be transmitted.

14. The communication congestion control device of claim 13, wherein the data transmission rate is selected from among predetermined available data transmission rates.

15. A communication congestion control method, comprising:

receiving driving information about surrounding vehicles and statistic information about communication conditions with the surrounding vehicles;

setting or changing a time frame to be used in data transmission and reception based on the driving information about the surrounding vehicles and the statistic information;

setting a data transmission rate, based on a length of a time slot in the time frame, and a message generation rate used when generating data to be transmitted to the surrounding vehicles;

setting a level of transmission power to be reduced when the data transmission rate is over a maximum data transmission rate available during inter-vehicle communication; and generating data on the driving information about the host vehicle based on the data transmission rate and the message generation rate and transmitting the data to the surrounding vehicles.

16. The communication congestion control method of claim 15, wherein the setting or changing the time frame further comprises a period of the time frame and a number of time slots in the time frame at a certain time interval based on surrounding communication conditions.

17. The communication congestion control method of claim 15, further comprising:

receiving a sensing signal of the host vehicle through an in-vehicle communication network and a GPS signal from a GPS receiver;

calculating driving information about the host vehicle on the basis of the received information; and transmitting the driving information about the host vehicle and the driving information about the surrounding vehicles to a vehicle safety system.

* * * * *